United States Patent
Ryu

(10) Patent No.: US 11,364,947 B2
(45) Date of Patent: Jun. 21, 2022

(54) RACK SUPPORTING DEVICE FOR VEHICLE STEERING SYSTEMS

(71) Applicants: HYUNDAI MOTOR COMPANY, Seoul (KR); KIA MOTORS CORPORATION, Seoul (KR)

(72) Inventor: Sang Woock Ryu, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 59 days.

(21) Appl. No.: 17/080,381

(22) Filed: Oct. 26, 2020

(65) Prior Publication Data

US 2021/0129897 A1    May 6, 2021

(30) Foreign Application Priority Data

Nov. 4, 2019    (KR) ........................ 10-2019-0139228

(51) Int. Cl.
     *F16H 55/18*      (2006.01)
     *B62D 3/12*      (2006.01)
     *F16H 55/28*      (2006.01)

(52) U.S. Cl.
     CPC ........... *B62D 3/123* (2013.01); *F16H 55/283* (2013.01); *F16H 2055/281* (2013.01)

(58) Field of Classification Search
     CPC ......... B62D 3/123; B62D 3/12; F16H 55/283; F16H 2055/281; F16H 55/28; F16H 2057/0224

See application file for complete search history.

(56) References Cited

U.S. PATENT DOCUMENTS

| | | | | |
|---|---|---|---|---|
| 5,709,283 A * | 1/1998 | Nief | ......................... | F16J 15/56 180/428 |
| 5,778,731 A * | 7/1998 | Heep | ....................... | F16C 29/02 384/255 |
| 5,961,219 A * | 10/1999 | Maughan | .................. | F16F 1/38 384/220 |
| 6,177,742 B1 * | 1/2001 | Lauk | ....................... | B60S 1/166 310/99 |
| 6,418,808 B1 * | 7/2002 | Kishizawa | ............... | B62D 3/12 74/396 |

(Continued)

FOREIGN PATENT DOCUMENTS

| | | | | |
|---|---|---|---|---|
| DE | 102012108780 A1 * | 5/2014 | .............. | B62D 3/12 |
| EP | 1787890 A1 * | 5/2007 | .............. | B62D 3/12 |
| KR | 20090121916 A | 11/2009 | | |

*Primary Examiner* — Jake Cook
(74) *Attorney, Agent, or Firm* — Lempia Summerfield Katz LLC

(57) ABSTRACT

A rack supporting device for vehicle steering systems includes: a steering housing having a steering gear installed therein; a rack bar longitudinally inserted into the steering housing to engage with the steering gear; a tapered passage defined in an inner circumference of the steering housing, wherein the tapered passage is eccentric with an axial center of the steering housing; a rack bushing inserted between an inner circumference of the tapered passage and an outer circumference of the rack bar so that the rack bushing moves along the tapered passage and pushes the rack bar to the steering gear; and an elastic member mounted to one side of the tapered passage to provide an elastic pressing force for pushing the rack bar to the rack bushing.

10 Claims, 5 Drawing Sheets

(56) References Cited

U.S. PATENT DOCUMENTS

| | | | | |
|---|---|---|---|---|
| 2006/0266140 A1* | 11/2006 | Harer | ............... | B62D 5/22 |
| | | | | 74/89.12 |
| 2011/0303034 A1* | 12/2011 | Plataret | ............... | B62D 3/123 |
| | | | | 74/409 |
| 2016/0144888 A1* | 5/2016 | Maier | ............... | F16H 57/022 |
| | | | | 74/109 |

* cited by examiner

FIG. 1 – Prior Art
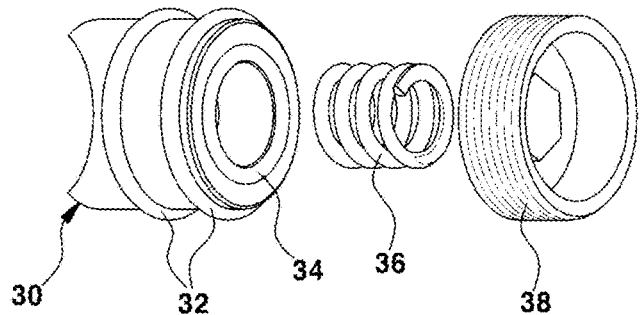
FIG. 2 – Prior Art
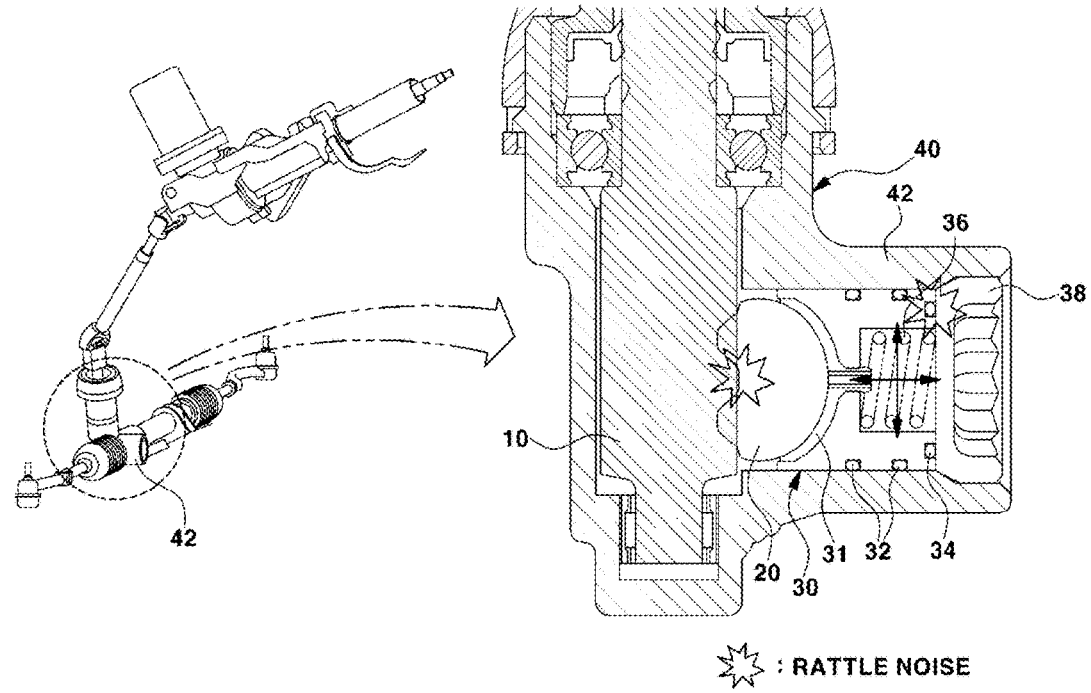

RACK SUPPORTING DEVICE FOR VEHICLE STEERING SYSTEMS

CROSS-REFERENCE TO RELATED APPLICATION

This application claims under 35 U.S.C. § 119(a) the benefit of priority to Korean Patent Application No. 10-2019-0139228 filed on Nov. 4, 2019, the entire contents of which are incorporated herein by reference.

BACKGROUND

(a) Technical Field

The present disclosure relates to a rack supporting device for vehicle steering systems. More particularly, it relates to a rack supporting device capable of fundamentally preventing rattle noise by supporting a rack bar to engage with a steering gear without any gap using a wedge-shaped rack bushing that is eccentric with an axis of the rack bar.

(b) Background Art

In general, a power steering system for vehicles is a system that reduces the rotation operating force of a steering wheel. In recent years, power steering systems have been equipped with a motor driven power steering (MDPS) to change a steering force depending on the traveling speed of a vehicle in lieu of hydraulic power steering.

Referring to FIGS. 1 and 2, the power steering system includes a pinion-type steering gear 10 connected to a steering wheel, a rack bar 20 engaged with the steering gear to move left and right during steering, and a yoke 30 supportably pressed against the back surface of the rack bar 20 to maintain the engagement between the steering gear 10 and the rack bar 20.

The steering gear 10 is rotatably mounted in a steering housing 40 through a bearing. The yoke 30 is mounted in a yoke mounting tube 42 protruding from the lower portion of the steering housing 40.

In this case, the yoke 30 has a yoke sheet 31 attached to the front surface thereof and the yoke sheet 31 is substantially pressed against the back surface of the rack bar 20.

In addition, two or more first O-rings 32 are mounted on the body circumference of the yoke 30 and one or more second O-rings 34 are mounted on the back surface thereof.

The yoke 30 has the first and second O-rings 32 and 34 mounted thereto and has a spring 36 for elastically pressing the yoke 30. After the yoke 30, the O-rings 32 and 34, and the spring 36 are inserted into the yoke mounting tube 42 of the steering housing 40, a yoke plug 38 is fastened to the inlet of the yoke mounting tube 42 for compressing the spring 36.

As described above, fastening the yoke plug 38 to the inlet of the yoke mounting tube 42 pushes the yoke 30, with the spring 36 compressed, while the yoke 30 pushes the rack bar 20. The steering gear 10 is thus well engaged with the rack bar 20 without any gap.

Moreover, the first and second O-rings 32 and 34 serve to relieve the radial rattle noise of the yoke 30 and the spring 36 serves to absorb a longitudinal impact while pressing the yoke 30 to the rack bar 20.

However, the conventional yoke assembly structure as described above has the following problems.

First, if an impact (external force) when traveling on a rough road is transmitted to the rack bar through a tire, the rack bar is bent, and a gap between the steering gear and the rack bar occurs. At the same time, a gap between the rack bar and the yoke occurs while the rack bar is continuously pushed toward the yoke, which results in rattling due to the gaps.

Second, in order to reduce the rattling, a method may be applied of reducing the gap between the yoke and the yoke plug by increasing the fastening force and fastening depth of the yoke plug. However, this deteriorates steering performance due to an increase in frictional force for steering.

In other words, as the frictional force between the rack bar and the yoke sheet and the frictional force between the rack bar and the steering gear increase, a smooth steering feel is not provided.

Third, even if the frictional force between the rack bar and the yoke sheet and the frictional force between the rack bar and the steering gear increase, the rattling may occur since the gap between the yoke and the yoke plug is increased again because of wear due to the deterioration of the durability of the yoke sheet.

The above information disclosed in this Background section is only to enhance understanding of the background of the disclosure. Therefore, the Background section may contain information that does not form the prior art that is already known in this country to a person of ordinary skill in the art.

SUMMARY OF THE DISCLOSURE

The present disclosure has been made in an effort to solve the above-described problems associated with the prior art.

In an aspect, the present disclosure provides a rack supporting device for vehicle steering systems. The rack supporting device includes a wedge-shaped rack bushing that is eccentric with an axis of a rack bar, a plug for supporting the rack bushing with a spring, etc., and these components are installed between an inner circumference of a steering housing and an outer circumference of the rack bar, thereby enabling the rack bushing or the like to support the rack bar to engage with a steering gear without any gap, even if an external force is transmitted to the rack bar. Thus, rattle noise is fundamentally prevented.

A rack supporting device for vehicle steering systems is provided. The rack supporting device includes: a steering housing having a steering gear installed therein; a rack bar longitudinally inserted into the steering housing to engage with the steering gear; a tapered passage defined in an inner circumference of the steering housing, wherein the tapered passage is eccentric with an axial center of the steering housing; a rack bushing inserted between an inner circumference of the tapered passage and an outer circumference of the rack bar so that the rack bushing moves along the tapered passage and pushes the rack bar to the steering gear; and an elastic member mounted to one side of the tapered passage to provide an elastic pressing force for pushing the rack bar to the rack bushing.

One wall of the tapered passage facing a back surface of the rack bar may be thicker than the other wall of the tapered passage facing a front tooth surface of the rack bar.

The rack bushing may have an outer circumference that is formed of a tapered surface configured to come into contact with the tapered passage.

The tapered surface may be in contact with one wall of the tapered passage facing a back surface of the rack bar.

The rack bushing may have an inner circumference that is formed of a rectilinear contact surface pressed against a back surface of the rack bar to push the rack bar to the steering gear.

A liner may be inserted into an inner circumference of the rack bushing to reduce friction with the rack bar.

The elastic member may be a Belleville spring.

A plug may be fixedly mounted behind the elastic member in the steering housing to prevent separation of the elastic member and the rack bushing.

The plug may have a through-hole formed at its center so that the rack bar passes through the through-hole. The plug may have a male thread formed on its outer circumference so that the male thread is fastened to a female thread formed on the steering housing.

The through-hole of the plug may have a hexagonal shape to insert a screw fastening tool thereinto.

Other aspects and embodiments of the disclosure are discussed hereinbelow.

It should be understood that the terms "vehicle" or "vehicular" or other similar terms as used herein are inclusive of motor vehicles in general such as: passenger automobiles including sports utility vehicles (SUV), buses, trucks, and various commercial vehicles; watercraft including a variety of boats and ships; aircraft; and the like. Such motor vehicles also include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed hereinbelow.

BRIEF DESCRIPTION OF THE DRAWINGS

The above and other features of the present disclosure are now described in detail with reference to certain embodiments thereof illustrated the accompanying drawings, which are given hereinbelow by way of illustration only, and thus are not limitative of the present disclosure, and wherein:

FIG. 1 is a perspective view illustrating a conventional rack supporting device for steering systems;

FIG. 2 is a cross-sectional view illustrating an installed state of the conventional rack supporting device for steering systems;

Figure 3:
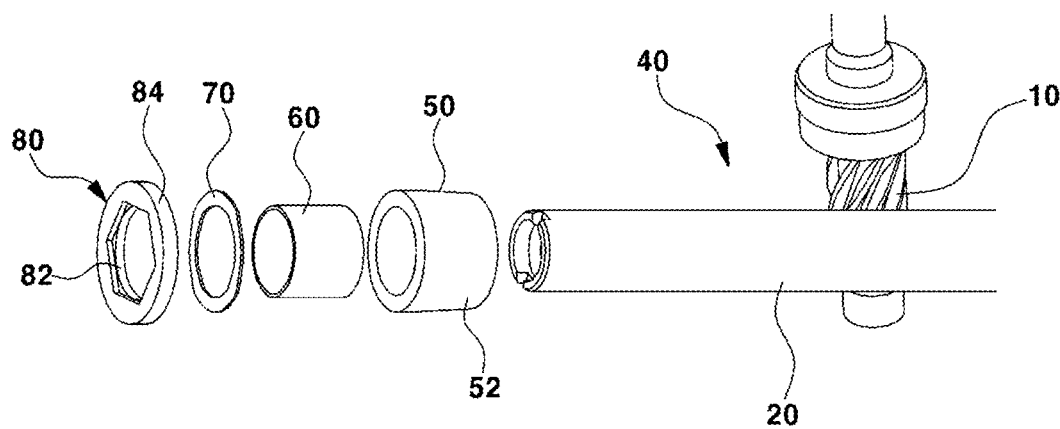
FIG. 3 is a perspective view illustrating a rack supporting device for steering systems according to the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, the same reference numbers refer to the same or equivalent parts of the present disclosure throughout the several figures of the drawing.

DETAILED DESCRIPTION

Hereinafter, reference is made in detail to various embodiments of the present disclosure, examples of which are illustrated in the accompanying drawings and described below. While the disclosure is described in conjunction with specific embodiments, it should be understood that the present description is not intended to limit the disclosure to those specific embodiments. On the contrary, the disclosure is intended to cover not only the specific disclosed embodiments, but also various alternatives, modifications, equivalents, and other embodiments, which may be included within the spirit and scope of the disclosure as defined by the appended claims.

Figure 4:
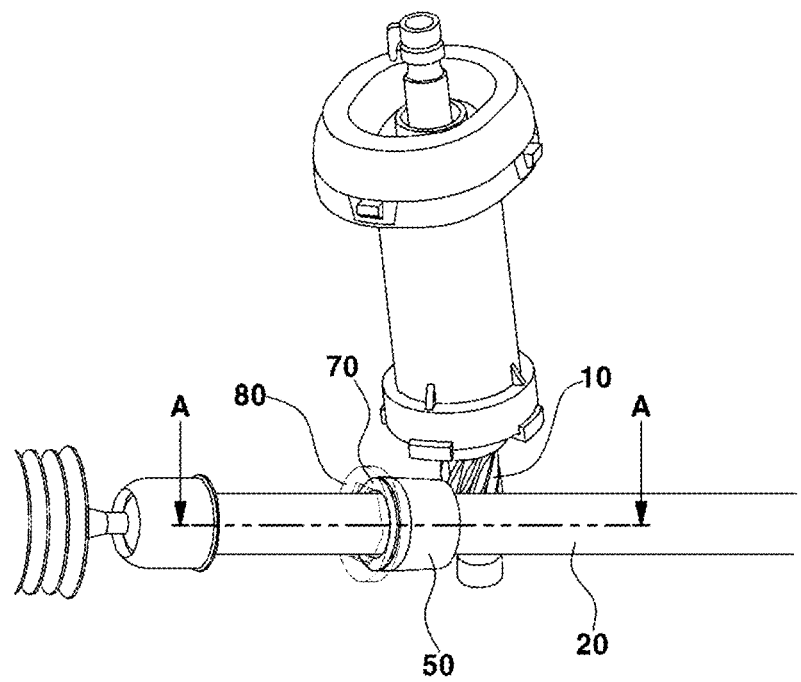
FIG. 4 is a schematic view illustrating an installation position of the rack supporting device for steering systems according to the present disclosure.
Figure 5:
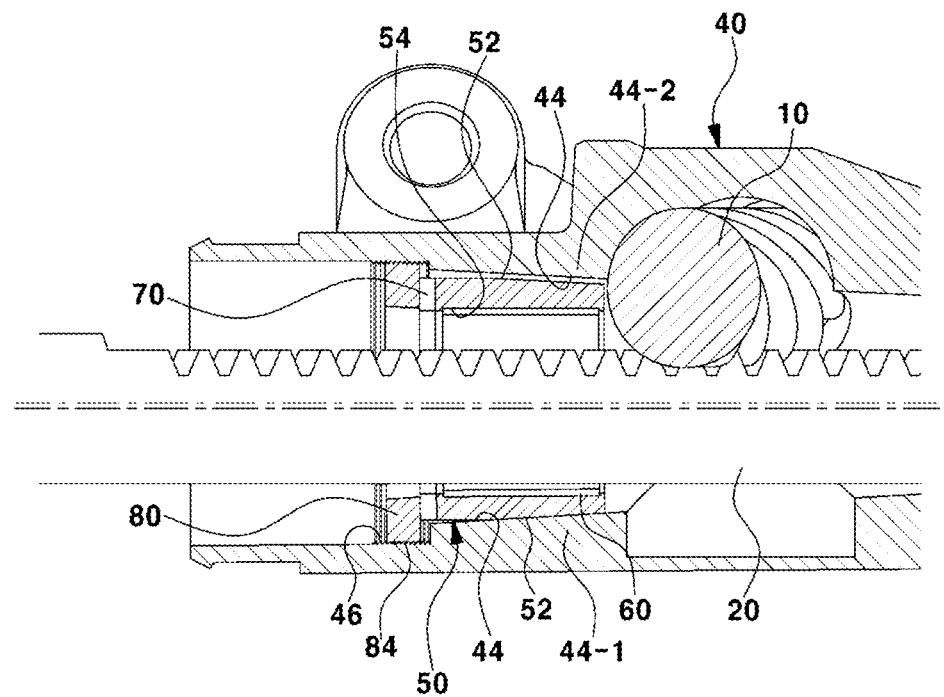
FIG. 5 is a cross-sectional view taken along line A-A of FIG. 4.
Figure 6:
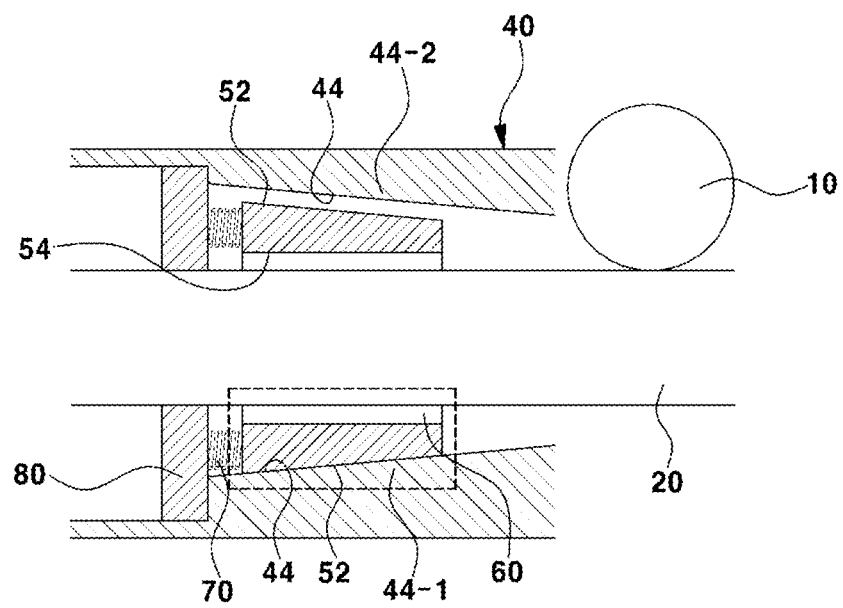
FIG. 6 is a schematic cross-sectional view illustrating the rack supporting device for steering systems according to the present disclosure.

FIG. 3 is a perspective view illustrating a rack supporting device for steering systems according to the present disclosure. FIG. 4 illustrates an installation position of the rack supporting device according to the present disclosure. FIGS. 5 and 6 are cross-sectional views illustrating the rack supporting device according to the present disclosure.

In FIGS. 3-6, reference numeral 40 refers to a steering housing.

A pinion-type steering gear 10 is connected to a steering wheel and is rotatably disposed in the steering housing 40.

A rack bar 20 is engaged with the steering gear 10 and is disposed in the steering housing 40 in the left-and-right longitudinal direction thereof.

Thus, when the steering wheel is steered or rotated, the rotational motion of the steering gear 10 is converted into a linear motion on the rack bar 20 so that driving wheels are steered or turned.

According to the present disclosure, a tapered passage 44, which is eccentric with the axial center of the steering housing 40, is defined in the inner circumference of the steering housing 40.

In more detail, as illustrated in FIGS. 5 and 6, one wall 44-1 of the tapered passage 44 faces the back surface of the rack bar 20 (the side without teeth engaged with the steering gear). The one wall 44-1 is thicker than the other wall 44-2 of the tapered passage 44 that faces the front tooth surface of the rack bar 20. Thus, the center of the tapered passage 44 is eccentric with the axial center of the steering housing 40.

Here, a tubular rack bushing 50 may be made of an aluminum material and is inserted between the inner circumference of the tapered passage 44 and the outer circumference of the rack bar 20.

The rack bushing 50 moves along the tapered passage 44 and serves to push the rack bar 20 to the steering gear 10.

To this end, the outer circumference of the rack bushing 50 is formed of a tapered surface 52 that is configured to or is capable of coming into contact with the tapered passage 44. The tapered surface 52 is in contact with the surface of the one wall 44-1 of the tapered passage 44 that faces the back surface of the rack bar 20 (the side without teeth engaged with the steering gear).

In this case, the surface of the other wall 44-2 of the tapered passage 44 that faces the front tooth surface of the rack bar 20 and the tapered surface 52 of the rack bushing 50 are maintained with a predetermined gap therebetween.

On the other hand, the inner circumference of the rack bushing 50 is formed of a rectilinear contact surface 54 that is pressed against the back surface of the rack bar (the surface without teeth engaged with the steering gear) to push the rack bar 20 to the steering gear 10.

A liner 60, which is substantially in contact with the rack bar 20, is inserted into and mounted in the inner circumference of the rack bushing 50. The liner 60 functions to reduce friction with the rack bar 20 while blocking the rack bushing 50 from coming into direct contact with the rack bar 20. The liner 60 thus functions to prevent the wear of the rack bushing 50.

According to the present disclosure, an elastic member 70 is inserted into and mounted in one side of the tapered passage 44 to provide an elastic pressing force for pushing the rack bar 20 to the rack bushing 50.

The elastic member 70 may be adopted as, i.e., may be a ring-shaped Belleville spring or Belleville washer for the passage of the rack bar 20.

In addition, a plug 80 prevents the separation of the elastic member 70 and the rack bushing 50 and is fixedly mounted behind the elastic member 70 in the steering housing 40.

The plug 80 has a through-hole 82 formed at the center thereof so that the rack bar 20 passes through the through-hole 82. The plug 80 has a male thread 84 formed on the outer circumference thereof so that the male thread 84 is fastened to a female thread 46 formed on the steering housing 40.

The through-hole 82 of the plug 80 has a hexagonal shape in order to insert (i.e., receive therein) a screw fastening tool carried by a worker.

Accordingly, after the plug 80 is inserted behind the elastic member 70 in the steering housing 40, the screw fastening tool carried by the worker is inserted into the through hole 82 of the plug 80 and then turns the plug 80. Consequently, the male thread 84 of the plug 80 is screwed to the female thread 46 of the steering housing 40.

In addition, after the plug 80 is screwed in, the elastic member 70 is supported by the plug 80 while providing an elastic pressing force to the rack bushing 50.

The operating principle of the rack supporting device having the above-mentioned configuration according to the present disclosure is described hereinbelow.

Figure 7:
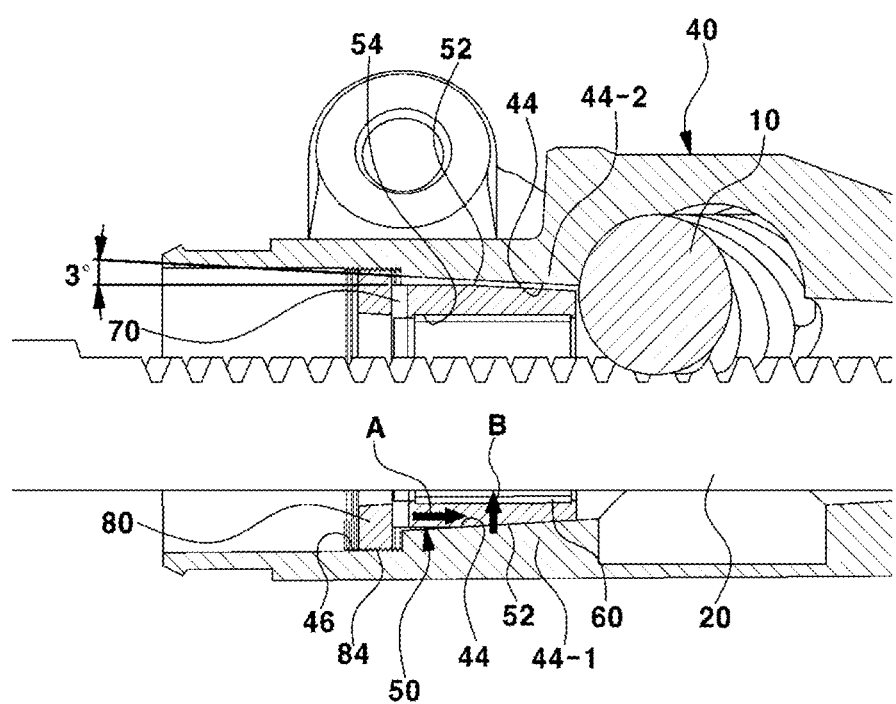
FIG. 7 is a cross-sectional view illustrating a principle that a gap between a rack bar and a steering gear is compensated for when a yoke liner is worn in the rack supporting device according to the present disclosure.

FIG. 7 is a cross-sectional view illustrating a principle that the gap between the rack bar and the steering gear is compensated for when the yoke liner is worn in the rack supporting device according to the present disclosure.

First, in the state in which the elastic member 70 is supported by the plug 80, the rack bushing 50 is provided with an elastic pressing force (in the direction of the arrow indicated by A in FIG. 7).

Thus, the rack bushing 50 is pushed in the direction of the arrow indicated by A in FIG. 7 by the elastic pressing force of the elastic member 70.

Consequently, the tapered surface 52 of the rack bushing 50 is always in contact with the tapered passage 44 of the steering housing 40 by the elastic pressing force of the elastic member 70.

In more detail, the tapered surface 52 of the rack bushing 50 is in contact with the one wall 44-1 of the tapered passage 44 that faces the back surface of the rack bar 20 (the side without teeth engaged with the steering gear) by the elastic pressing force of the elastic member 70. The taper angle of the mutually contacted portions may be, for example, about 3°.

In addition, the rectilinear contact surface 54 of the rack bushing 50 is pressed against the back surface of the rack bar (the surface without teeth engaged with the steering gear). At the same time, the rack bar 20 is pushed to the steering gear 10 (in the direction of the arrow indicated by B in FIG. 7).

Substantially, the liner 60 mounted on the inner circumference of the rack bushing 50 pushes the rack bar 20 to the steering gear 10.

Thus, the rack bar 20 may always engage with the steering gear 10 without any gap therebetween.

Moreover, even if the liner 60 is worn, the tapered surface 52 of the rack bushing 50 may always be in constant contact with the tapered passage 44 of the steering housing 40 while the rack bushing 50 is pushed by the elastic pressing force of the elastic member 70. This is because the elastic pressing force continues to act on the rack bushing 50. In addition, the liner 60 pushes the rack bar 20 to the steering gear 10 while continuing to be pressed against the back surface of the rack bar 20 (the surface without teeth engaged with the steering gear).

Thus, the rack bar 20 may engage with the steering gear 10 without any gap therebetween, even though the liner 60 is worn.

Figure 8:
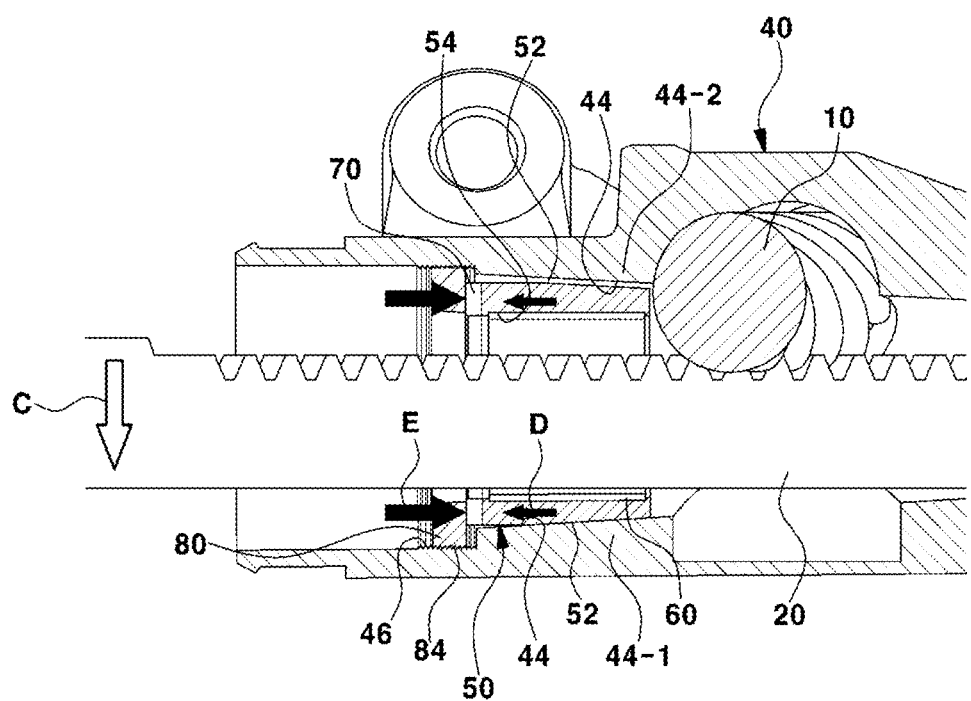
FIG. 8 is a cross-sectional view illustrating a principle of rattle noise prevention in the rack supporting device according to the present disclosure.

Meanwhile, when a vehicle travels on a rough road, an impact caused by the road may be transmitted to the rack bar 20 in the radial direction thereof (in the direction of the arrow indicated by C in FIG. 8) via a tie rod. The rack bar 20 may be bent due to the impact transmitted thereto.

Hence, in the related art, as described above with reference to FIGS. 1 and 2, the gap between the steering gear 10 and the rack bar 20 occurs and at the same time the gap between the rack bar 20 and the yoke 30 occurs while the rack bar 20 is pushed toward the yoke 30, which results in rattling due to the gaps.

In other words, since the radial impact transmitted to the rack bar 20 is greater than the load (elastic compressive force) of the spring 36, the yoke 30 strikes the yoke plug 38 while the yoke 30 is pushed backward by the instant compression of the spring 36, resulting in an impact sound. Then, the rack bar 20 strikes the steering gear 10 while the rack bar 20 is pushed back to the steering gear 10 by the elastic restoring force of the spring 36, resulting in an impact sound.

However, in the present disclosure, even if the external impact load input to the rack bar 20 in the radial direction thereof (in the direction of the arrow indicated by C in FIG. 8) is transmitted to the rack bushing 50, there is no gap between the rack bushing 50 and the rack bar 20. This is because the axial movement force (indicated by the arrow D in FIG. 8) of the rack bushing 50 caused by the external impact load does not overcome the compressive load (indicated by the arrow E in FIG. 8) of the Belleville spring as the elastic member 70.

In more detail, since the compressive load of the Belleville spring as the elastic member 70 is greater than the axial movement force of the rack bushing 50 caused by the external impact load (the external impact load input to the rack bar in the radial direction thereof×sin (taper angle of 3°)), the rack bushing 50 is not moved. Consequently, there is no gap between the rack bushing 50 and the rack bar 20 at all. Thus, the existing rattle noise does not occur.

As such, by defining the tapered passage 44 that is eccentric with the axis of the rack bar within the steering housing 10, and by installing the wedge-shaped rack bushing 50, the elastic member 70 for pressing the rack bushing 50, etc., within the tapered passage 40, the rack bushing 50 can press and support the rack bar 20 to engage with the steering gear 10 without any gap even if an external force is transmitted to the rack bar 20. Thus, it is possible to fundamentally prevent the rattle noise caused by the existing gap.

In addition, since the conventional rack supporting device is installed in a direction perpendicular to the rack bar, the yoke mounting tube 42, in which the yoke, the yoke plug, etc., are installed, should protrude from the lower portion of the steering housing 40, as illustrated in FIG. 2. However, since the rack supporting device of the present disclosure is installed in the steering housing 40 in the longitudinal direction thereof, it is possible to eliminate the existing yoke mounting tube 42. Thus, to provide an advantage in terms of packaging of the rack supporting device mounted in the steering housing.

In accordance with the specific embodiments, the present disclosure provides the following effects.

First, by defining the tapered passage that is eccentric with the axis of the rack bar within the steering housing, and by installing the wedge-shaped rack bushing, the spring for pressing the rack bushing, etc., within the tapered passage, the rack bushing or the like can press and support the rack bar to engage with the steering gear without any gap, even if an external force is transmitted to the rack bar.

Second, since there is no gap between the rack bar and the steering gear, it is possible to fundamentally prevent rattle noise due to any gap.

Third, since the structure of the present disclosure is simpler than that of the conventional rack supporting device, it is possible to reduce the number of parts and achieve a reduction in weight.

Fourth, since the conventional rack supporting device is installed in a direction perpendicular to the rack bar, the yoke mounting tube, in which the yoke, the yoke plug, etc., are installed, should protrude from the lower portion of the steering housing. However, since the rack supporting device of the present disclosure is installed in the steering housing in the rack longitudinal direction thereof, it is possible to eliminate the existing yoke mounting tube. Thus, provide an advantage in terms of packaging of the rack supporting device is also provided.

The disclosure has been described in detail with reference to specific embodiments thereof. However, it should be appreciated by those having ordinary skill in the art that changes may be made in these embodiments without departing from the principles and spirit of the disclosure, the scope of which is defined in the appended claims and their equivalents.

What is claimed is:

1. A rack supporting device for vehicle steering systems, the rack supporting device comprising:
    a steering housing having a steering gear installed therein;
    a rack bar longitudinally inserted into the steering housing to engage with the steering gear;
    a tapered passage defined in an inner circumference of the steering housing, wherein the tapered passage is eccentric with an axial center of the steering housing;
    a rack bushing inserted between an inner circumference of the tapered passage and an outer circumference of the rack bar so that the rack bushing moves along the tapered passage and pushes the rack bar to the steering gear; and
    an elastic member mounted to one side of the tapered passage to provide an elastic pressing force for pushing the rack bar to the rack bushing.

2. The rack supporting device of claim 1, wherein one wall of the tapered passage facing a back surface of the rack bar is thicker than the other wall of the tapered passage facing a front tooth surface of the rack bar.

3. The rack supporting device of claim 1, wherein the rack bushing has an outer circumference that is formed of a tapered surface configured to come into contact with the tapered passage.

4. The rack supporting device of claim 3, wherein the tapered surface is in contact with one wall of the tapered passage facing a back surface of the rack bar.

5. The rack supporting device of claim 1, wherein the rack bushing has an inner circumference that is formed of a rectilinear contact surface pressed against a back surface of the rack bar to push the rack bar to the steering gear.

6. The rack supporting device of claim 1, wherein a liner is inserted into an inner circumference of the rack bushing to reduce friction with the rack bar.

7. The rack supporting device of claim 1, wherein the elastic member is a Belleville spring.

8. The rack supporting device of claim 1, wherein a plug is fixedly mounted behind the elastic member in the steering housing to prevent separation of the elastic member and the rack bushing.

9. The rack supporting device of claim 8, wherein the plug has a through-hole formed at its center so that the rack bar passes through the through-hole, and wherein the plug has a male thread formed on its outer circumference so that the male thread is fastened to a female thread formed on the steering housing.

10. The rack supporting device of claim 9, wherein the through-hole of the plug has a hexagonal shape to insert a screw fastening tool thereinto.

* * * * *